United States Patent [19]
Walding, Jr. et al.

[11] Patent Number: 5,734,103
[45] Date of Patent: Mar. 31, 1998

[54] SEALED WIRE ENTRY FOR INSTRUMENT HOUSING AND METHOD OF SEALING

[75] Inventors: H. Paul Walding, Jr., Slinger; Andrew J. Paese, Plymouth; John D. Stolz, Grafton, all of Wis.

[73] Assignee: Badger Meter, Inc., Milwaukee, Wis.

[21] Appl. No.: 710,237

[22] Filed: Sep. 13, 1996

[51] Int. Cl.⁶ ...................................................... G01F 15/14
[52] U.S. Cl. .................. 73/201; 73/273; 73/431; 174/17.05; 174/17 GF; 174/17 CT; 174/50.56; 174/65 R
[58] Field of Search ............................ 73/201, 273, 195, 73/197, 431; 304/156; 174/17.05, 17.08, 17 GF, 17 CT, 50.5, 18, 50.52, 50.54, 50.56, 50.01, 50.62, 65 R, 65 G; 235/103

[56] References Cited

U.S. PATENT DOCUMENTS

| | | |
|---|---|---|
| 3,781,456 | 12/1973 | Knowles et al. ............... 174/18 |
| 5,298,894 | 3/1994 | Cerny et al. .................. 340/870.02 |
| 5,339,686 | 8/1994 | DeJarlais et al. ................ 73/201 |
| 5,365,785 | 11/1994 | Martin ........................ 73/431 |

*Primary Examiner*—Michael Brock
*Attorney, Agent, or Firm*—Quarles & Brady

[57] ABSTRACT

A sealed wire entry port for a housing (10) having a base (12) and a top (11), and a body of sealing material (16) joining the top (11) to the base (12) and a pair of insulated wires (21) in which the insulation (31) is removed where the wires (21) run through the body of sealing material (16), a plug (22) disposed in an opening in the base (12), wherein the two wires (21) run through the plug (22) into the sealing material (16) and a vent (23) that runs through the plug (22) into the housing (10), wherein the vent (23) is adapted to be closed after a gas has been either evacuated or introduced into the interior of the housing (10) to reduce moisture within the housing before final sealing. A method of assembling and sealing the unit (10) is also disclosed.

19 Claims, 2 Drawing Sheets

SEALED WIRE ENTRY FOR INSTRUMENT HOUSING AND METHOD OF SEALING

TECHNICAL FIELD

The invention relates to the sealing of wire entry into instruments for measuring quantities such as electricity, gas and water consumption.

DESCRIPTION OF THE BACKGROUND ART

In the field of water meters, a turbine or other flow measuring device is connected in the water supply line. Water consumption units are counted and displayed by a register unit that is mounted on top of the flow measurement housing. The display may be a dial-type or an odometer-type or a combination of these. The register unit is operated by electromagnetic coupling, so that no wires are required to connect the flow measurement housing to the register unit.

Inside the register is a pulse transmitter as described in Strobel et al., U.S. Pat. No. 4,868,566, entitled "Flexible Piezoelectric Switch Activated Metering Pulse Generators." This pulse transmitter unit converts mechanical movements to electrical pulses. In certain units, the pulse must be transmitted via wires to certain remote transponder units for transmission to a reader unit. The need for the entry of wires presents a sealing problem, particularly when the register unit is to be used in harsh environments such as underground pits, where moisture is prevalent.

There is a further problem in assembly and manufacture of the register unit in evacuating air and introducing a gas such as helium to maintain the crystal area of the register in a clear, readable state, similar to that of a wristwatch.

There is a further technical problem with wires that enter an instrument housing. It has been found that in certain circumstances moisture can wick into a housing through an insulated wire between the wire conductor and the insulation.

The general objective of the present invention is to make improvements in the enclosure and methods of sealing the register unit particularly in a region where wires enter the unit.

SUMMARY OF THE INVENTION

The invention relates to a sealed instrument housing having two parts and a method of sealing such a housing.

A sealed wire entry port has a body of sealing material disposed between the top and the base of the instrument housing and a plurality of insulated wires in which the insulation is removed where the wires run through the sealing material. A plug is disposed in an opening in the base, where the two wires run through the plug into the sealing material. A vent extends through the plug into an interior space in the housing, and the vent is adapted to be closed after a gas has been passed through the vent to reduce moisture within the housing before final sealing.

The stripping and sealing of the wires at a seal joint of the housing prevents moisture from wicking into the housing through the insulated wires.

The invention provides a seal with a very low rate of leakage.

The invention provides significant advantages in the cost of manufacturing the meter register assembly.

The invention provides a continuous wire from the interior of the register to the exterior, eliminating extra electrical connections with short jumpers.

The invention is applicable to many types of instrument enclosures, wherever a sealed wire entry is needed.

In the method of the invention, a plug is provided in a sidewall of a base of the housing to be sealed. The plug includes a vent and at least two passageways for receiving wires. A pair of wires are stripped of insulation in an area to be sealed. The wires are positioned in the passages in the plug while positioning the stripped portion of the wires in a region to be filled with the sealing material. The sealing material is added in a bonding region between a top and a bottom of the housing. The sealing material is then cured. The gas content within the housing is then altered using the vent. In a preferred embodiment, this is accomplished by evacuating air and filling the instrument with helium. The vent is then closed to complete the sealing of the housing.

Other objects and advantages, besides those discussed above, will be apparent to those of ordinary skill in the art from the description of the preferred embodiment which follows. In the description, reference is made to the accompanying drawings, which form a part hereof, and which illustrate examples of the invention. Such examples, however, are not exhaustive of the various embodiments of the invention and, therefore, reference is made to the claims which follow the description for determining the scope of the invention.

DETAILED DESCRIPTION OF THE PREFERRED EMBODIMENT

Figure 1:
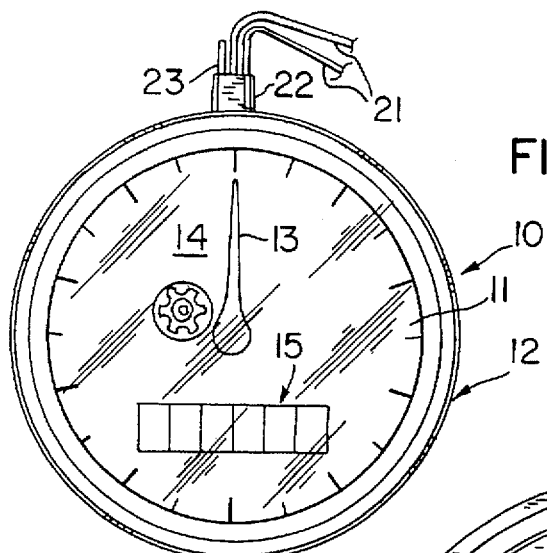
FIG. 1 is a top plan view of meter register assembly incorporating the present invention.
Figure 2:
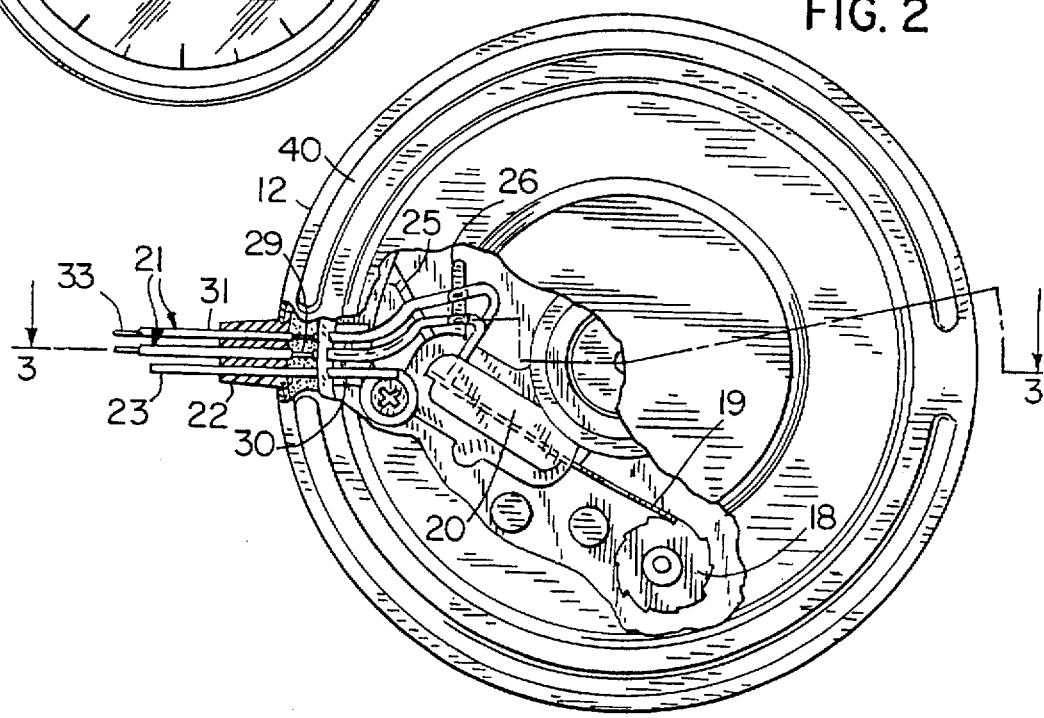
FIG. 2 is a bottom plan view of the assembly of FIG. 1 with parts broken away.
Figure 3:
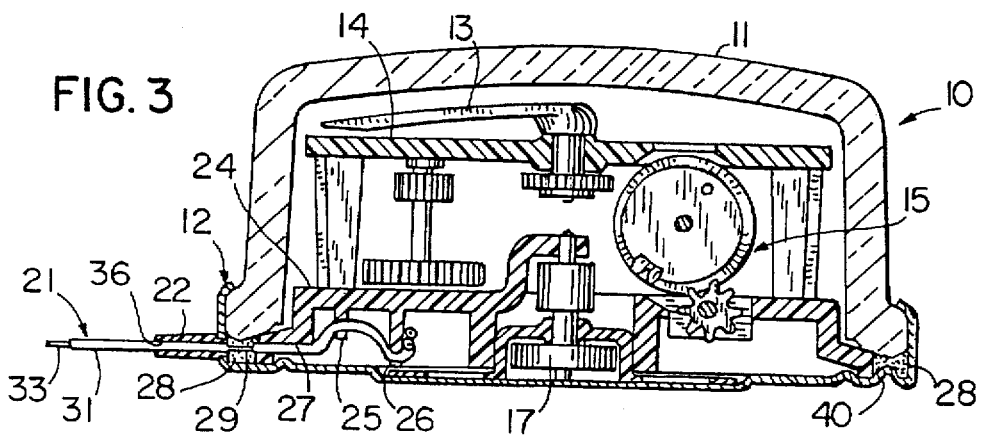
FIG. 3 is an elevational sectional view of the assembly taken in the plane indicated by line 3—3 in FIG. 2.

Referring to FIGS. 1–3, the invention is incorporated in a meter register assembly 10 in which insulated wires 21 enter in a region near the base 12. The register assembly 10 is shown without a plastic protective shell which is added to complete the meter register unit. The assembly 10 includes a glass dome or crystal 11 and a base 12 provided by a thin metal plate of brass that has been formed and shaped to add certain features. The crystal 11 is joined to the base 12 by a sealing material 16, which may be one of many suitable epoxy adhesives known in the art.

Looking through the crystal 11 in FIG. 1, there is seen a dial indicator hand 13, a dial face 14 and an odometer assembly 15. As seen in FIG. 3, the dial face 14 is part of a plastic chassis that is supported by a chassis base 24 of plastic material that is formed in a complex configuration.

As further seen in FIG. 3, the register unit 10 has a magnetic coupler 17 that is rotated by magnetic forces controlled from below by a water turbine unit (not shown). The magnetic coupler 17 is mechanically connected through a gear train (not shown) to drive the odometer 15 and the dial hand 14 to display accumulated consumption. The magnetic coupler 17 is also mechanically connected to drive a cam 18 seen in FIG. 2. When the cam 18, having the shape of a toothed gear, is advanced by one position, a leaf spring 19 cantilevered at one end has a free end that moves laterally and then moves back to its original position. This movement or flexing of the leaf spring 19 generates a pulse from the pulse transmitter unit 20 as explained in Strobel et al., U.S. Pat. No. 4,868,566, entitled "Flexible Piezoelectric Switch Activated Metering Pulse Generators."

The pulse transmitter 20 is connected by two wires 21 to other equipment for counting and reporting accumulated pulses. The wires 21 are marked for polarity. The wires 21 are typically conductors 33 sheathed in polyvinyl chloride (PVC) insulation material 31. In the preferred embodiment, the conductors 33 are solid wire conductors. It has been discovered that if a sealing material 16 such as adhesive 16 is filled around the insulated wires 21 at the point of entry into the register unit 10, then moisture can wick through the wire between the conductors 33 and the insulation 31.

Figure 4:
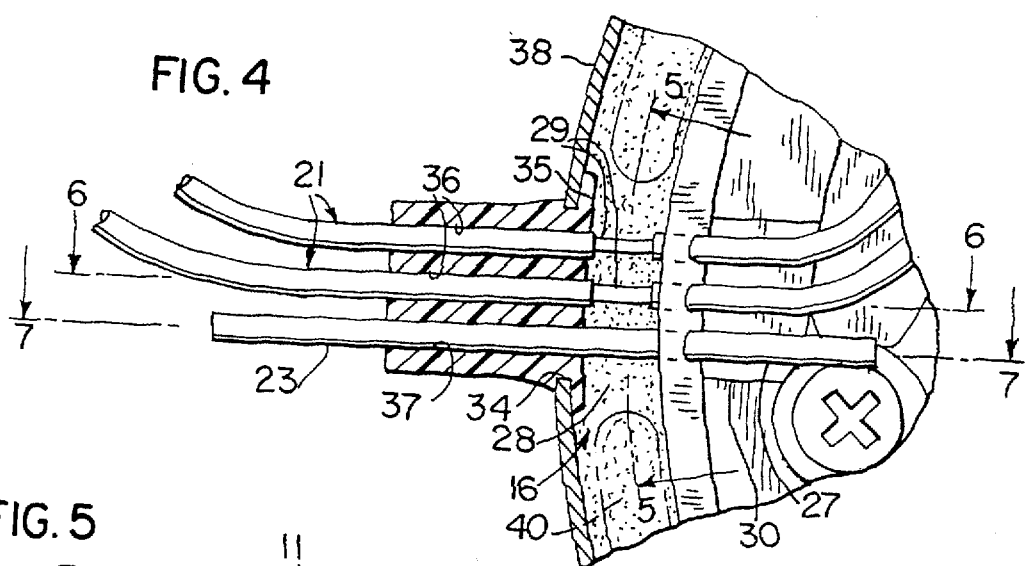
FIG. 4 is a detail view of a portion of the assembly of FIG. 2.
Figure 5:
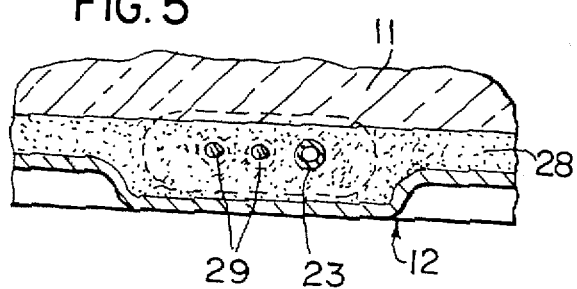
FIG. 5 is a detail sectional view taken in the plane indicated by line 5—5 in FIG. 4.
Figure 6:
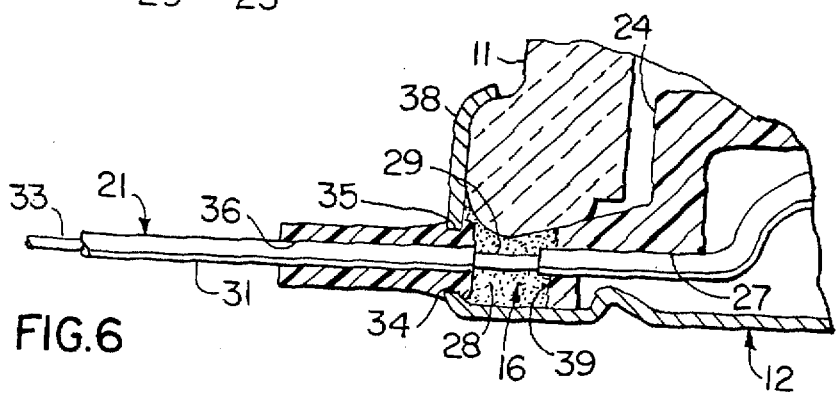
FIG. 6 is a detail sectional view taken in the plane indicated by line 6—6 in FIG. 4.
Figure 7:
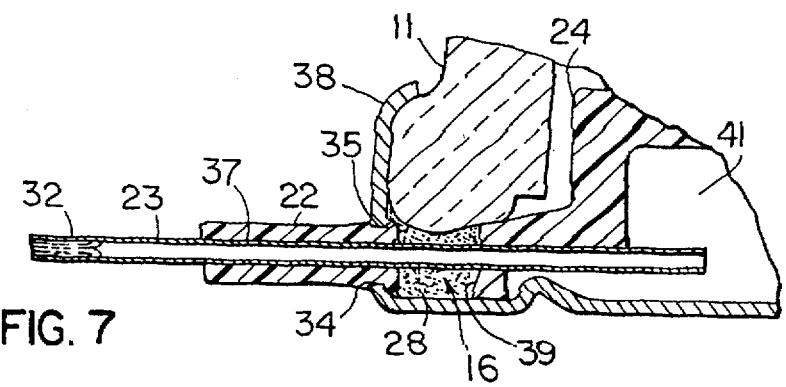
FIG. 7 is a detail sectional view taken in the plane indicated by line 7—7 in FIG. 4.

The invention provides a plug 22 in the form of a grommet of elastomeric material that projects through an opening 34 in a sidewall 38 of the base 12 (FIGS. 6 and 7). The grommet 22 has a flange and groove portion 35 for anchoring it in the sidewall 38 and to prevent it from being pulled through the opening 34. The grommet 22 has three holes or passageways 36 (FIGS. 6, 7), two for the wires 21 and a third passageway 37 for receiving a vent 23 formed by a length of copper tube material. The wires 21 pass through the grommet 22 and are then received in guideways 27 (FIGS. 2, 4) formed by parallel barriers 30 on the chassis base 24. From there, the wires 21 run through supports 25, 26 on the chassis base 24, and then connect to the pulse transmitter 20.

The invention provides for the stripping portions of the wires 29 in the region that is filled with sealing material 16. This sealing material 16 first fills a bonding region 28 between the crystal 11 and the base 12 and between the sidewall 38 and a circular wall 39 formed by the chassis base 24 (FIGS. 6, 7). The space between the sidewall 38 of the register base 12 and circular wall 39 of the chassis base 24 is partially occupied by two semicircular ribs 40 (FIGS. 2, 4) formed in the base 12. The ribs 40 have spaced apart opposing ends so that the wires 21 and the vent tube 23 can enter between them. This provides a slightly larger cross section to the bonding region 28 for sealing material 16 to fill in around the stripped portions 21. The use of the sealing material 16 over the stripped portions 29 prevents moisture from wicking through the wire underneath the insulation 33 and into the interior of the register unit 10.

The grommet 22, wires 21 and sealing material 16 are all installed in the assembly of the crystal 11 to the base 12. During assembly the vent 23 (FIG. 7) prevents air pressure from increasing inside the unit 10 during assembly. Then air is evacuated through the vent tube 23, and a gas is introduced to dry the interior space 41 and prevent moisture from accumulating inside the register unit 10. This gas can be helium, or a dry nitrogen could also be used to dry the interior space 41 in the register 10. The vent tube 23 is then closed at location 32, preferably by welding, but can also be closed by other techniques such as soldering, crimping or bending, or a combination of these.

This has been a description of examples of how the invention can be carried out. Those of ordinary skill in the art will recognize that various details may be modified in arriving at other detailed embodiments, and these embodiments will come within the scope of the invention.

For example, while solid conductors are advantageous, stranded conductors could also be used in the invention provided that steps are taken to seal between individual strands with a sealing adhesive or with solder.

Therefore, to apprise the public of the scope of the invention and the embodiments covered by the invention, the following claims are made.

We claim:

1. In an instrument housing having a top and a base joined together with a sealing material, a wire entry port comprising:

a plurality of wires with insulation in which the insulation is removed where the wires run through the sealing material;

a plug disposed in an opening in the base, wherein the plurality of wires run through the plug into the sealing material; and a vent that runs through the plug into the housing, wherein the vent is adapted to be closed after a gas has been either evacuated or introduced into the interior of the housing to reduce moisture within the housing before final sealing.

2. The wire entry port of claim 1, wherein the vent further comprises a metal tube.

3. The wire entry port of claim 1, wherein the plug is a grommet of elastomeric material, and wherein the base has a sidewall rising from a bottom, the sidewall having an opening in which the grommet is anchored.

4. The wire entry port of claim 1, wherein the wires include solid conductors and wherein the insulation is a polyvinyl chloride insulating material.

5. The wire entry port of claim 1, wherein the wires include conductors and the insulation and wherein the insulation is a polyvinyl chloride insulating material.

6. The wire entry port of claim 1, wherein said wire entry port is included in an instrument housing.

7. The wire entry port of claim 1, wherein said wire entry port is included in a housing for a utility meter.

8. The wire entry port of claim 1, wherein the plug is a grommet of elastomeric material with first and second passages for receiving wires and a third passage for receiving the vent.

9. A sealed instrument comprising:

a housing having a top and a base;

an instrument mechanism contained within the housing when the top is assembled to the base;

a body of sealing material joining the top to the base and forming a seal where the top is joined to the base;

a plurality of wires with insulation in which the insulation is removed where the wires run through the body of sealing material;

a plug disposed in an opening in the base, wherein the plurality of wires run through the plug into the sealing material; and a vent that runs through the plug into the housing, wherein the vent is adapted to be closed after a gas has been either evacuated or introduced into the interior of the housing to reduce moisture within the housing before final sealing.

10. The sealed instrument of claim 9, further comprising a chassis within the instrument housing having a circular wall that forms an inner boundary for a region of sealing and said chassis forming guideways for the wires entering the interior of the instrument housing.

11. The sealed instrument of claim 9, wherein said instrument is a utility meter register.

12. The sealed instrument of claim 9, wherein the vent further comprises a metal tube.

13. The sealed instrument of claim 9, wherein the wires include solid conductors and wherein the insulation is a polyvinyl chloride insulating material.

14. The sealed instrument of claim 9, wherein the wires include conductors and the insulation and wherein the insulation is a polyvinyl chloride insulating material.

15. The sealed instrument of claim 9, wherein the plug is a grommet of elastomeric material with first and second passages for receiving wires and a third passage for receiving the vent.

16. A method of assembly of a sealed housing, the method comprising:

providing a plug in a sidewall of a base of the housing to be sealed, the plug including a vent and at least two passageways for receiving wires;

stripping a plurality of wires of insulation in portions of the wires to be sealed;

positioning the wires in the passages in the plug while positioning the stripped portions of the wires in a region to be filled with a sealing material;

adding the sealing material in a bonding region between a top and a bottom of the housing;

curing the sealing material;

changing the gas content within the housing using the vent; and closing the vent to complete the sealing of the housing.

17. The method of claim 16, in which said wires are solid conductors with polyvinyl chloride insulation.

18. The method of claim 16, in which air is evacuated and helium is introduced through the vent.

19. The method of claim 16, in which the vent is a tube and wherein the vent is closed by welding an open end.

* * * * *